Oct. 18, 1955  E. NANZ  2,721,062
DEVICE FOR MAKING BUTTER
Filed Oct. 31, 1950  3 Sheets-Sheet 1
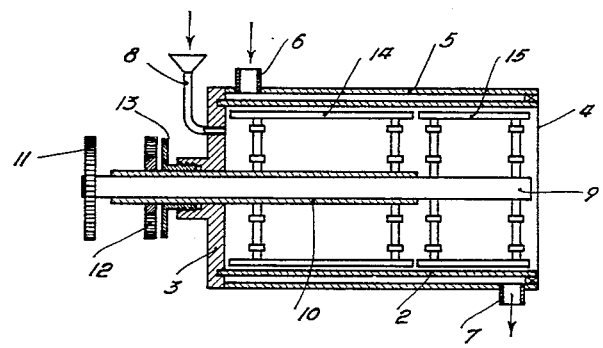
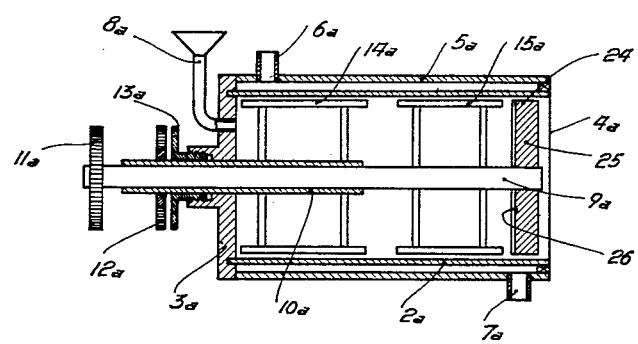
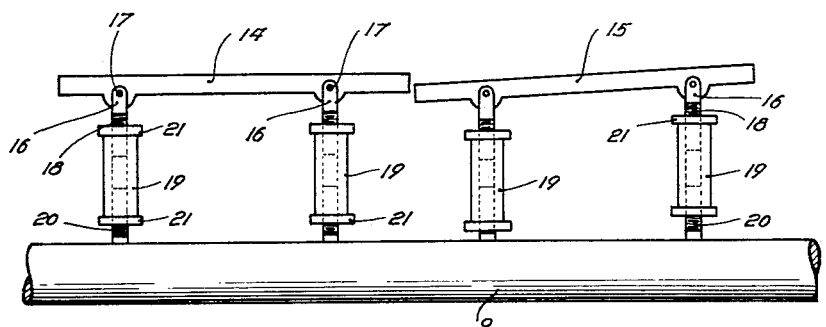
INVENTOR.
Ernst Nanz
BY
Webb, Mackey & Burden
HIS ATTORNEYS INVENTOR.
Ernst Nanz Oct. 18, 1955          E. NANZ          2,721,062
DEVICE FOR MAKING BUTTER
Filed Oct. 31, 1950          3 Sheets-Sheet 3
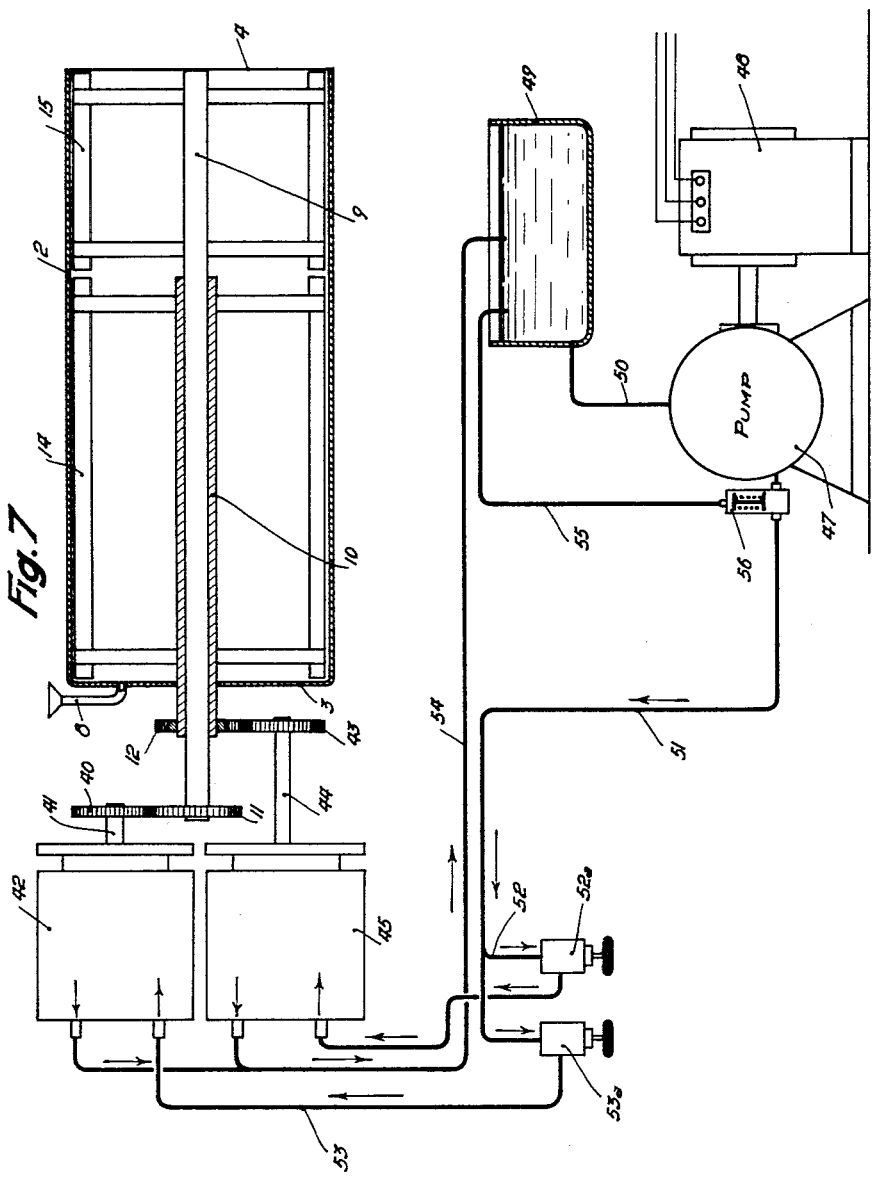
INVENTOR.
Ernst Nanz
BY
HIS ATTORNEYS

United States Patent Office 2,721,062
Patented Oct. 18, 1955

2,721,062
DEVICE FOR MAKING BUTTER

Ernst Nanz, Stuttgart, Germany, assignor to Societe Pour l'Equipment des Industries Laitiéres et Agricoles (S. E. I. L. A.) and W. J. Sidler, Paris, France, a corporation of France Application October 31, 1950, Serial No. 193,113

Claims priority, application France November 4, 1949

2 Claims. (Cl. 259—6)

This invention relates to a machine for continuously making butter. Such butter making machines are used with continuously operating moulding and packaging machines operating at a rigorously constant rate and therefore the output of the butter making machines must be constant irrespective of the particular composition of cream which is being churned and of the butter which is to be made.

An object of the present invention is the provision of a machine for making butter having different and desired water contents. The maximum water content of butter varies in different countries and from an economic standpoint it is desirable to be able to produce butter having the maximum water content allowed in the country in question. In France, for example, the maximum water content allowed is 16%.

Among the factors which influence the water content of butter are the following:

1. *The temperature of the cream being churned.*—High cream churning temperature produces large frothy grains containing much water, whereas lower churning temperature produces smaller, firmer grains containing less water.

2. *Fat content of the cream.*—A high fat content cream results in the rapid formation of butter with large grains containing much water. Cream containing a low fat content is converted more slowly into butter, the grains are smaller and they contain little water.

3. *Speed of churning.*—High churning speed, within limits, produces butter having a high water content and low churning speeds produce butter having a relatively low water content.

A machine is known, sometimes referred to as the "Fritz" machine, which is used for the continuous production of butter. This Fritz machine has a cylindrical jacket closed at its inlet end, open at its exit end, and provided with a shaft mounted within the cylinder. Vanes are secured to the shaft and are so arranged that they spread the material to be churned in the form of a thin layer on the inner surface of the cylinder, displace it along a helical path on the inner face of the cylinder and subject it to a succession of beating operations. This Fritz machine is not capable of operating in conjunction with continuous moulding and packaging machines in the production of butter having desired and variable water contents. If the speed of the churning member is adjusted in order to produce the desired water content in the butter, the output of the machine varies, whereas it should be substantially constant in order to cooperate satisfactorily with the moulding and packaging machines which are operated at a constant rate.

My invention overcomes the disadvantages of previously known continuous butter making machines. My machine can be operated so as to produce a desired and variable water content in the butter and still the output of the butter making machine can be maintained substantially constant so as to adapt it for use with moulding and packaging machines operated at a constant speed.

In accordance with my invention, the butter making machine comprises a substantially cylindrical container having an inlet for the cream or other material to be churned and an outlet for butter and whey. Two shafts are rotatably mounted in the cylinder in axial alignment with each other and each shaft is provided with churning vanes. The two shafts, and accordingly the vanes attached thereto, can be rotated independently of each other and at variable relative speeds. In addition, the different sets of vanes are so mounted on the shafts that the distance between the vanes and the peripheral wall of the container can be adjusted so as to provide the desired width of space between the vanes and the container wall. Also, the vanes can be adjusted so as to vary the obliquity of the vanes in an axial direction with respect to the peripheral wall of the container.

The cream to be churned passes through a first churning zone between the first set of churning vanes and the interior surface of the cylinder and then passes through a second churning zone between the second set of churning vanes and the interior of the cylinder. The speed of rotation of the first set of churning vanes is adjusted so as to give the optimum butter making conditions, taking into consideration the fat content of the cream, its temperature and other factors. The butter so produced then passes through a second churning zone in which the rotation speed of the churning members is adjusted to produce the desired water content in the butter. Air or other gas can be introduced into the cream before it enters the churning cylinder so as to provide the required bulk for moulding the butter in the moulding machine.

In the accompanying drawings which illustrate a preferred embodiment of the invention and some modifications thereof Figure 1 is a longitudinal section through one embodiment of my churn;

Figure 2 is a longitudinal section through a churn illustrating a different embodiment of my invention;

Figure 3 is a side elevation, on an enlarged scale, of a portion of the machine showing the means for adjustably mounting the vanes on the rotatable shafts;

Figure 7 illustrates in a diagrammatic manner a means for driving the two sets of churning vanes independently and at variable speeds.

Figure 4:
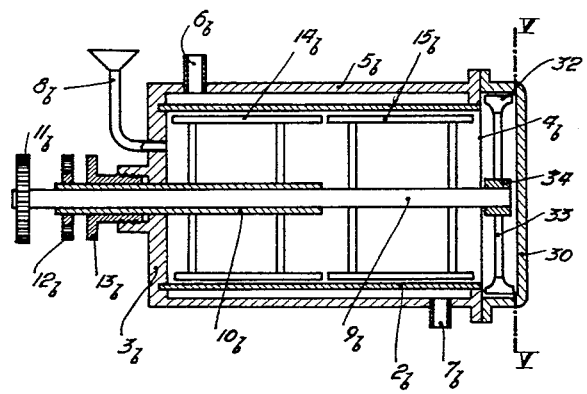
Figure 4 is a longitudinal section through a further embodiment of the invention.

Referring more particularly to the accompanying drawings and for the present to the embodiment illustrated in Figures 1 and 3, the churn comprises a cylinder 2 which is closed at its left-hand end by a plate 3 and is open at its right-hand end 4. The cylinder 2 is provided with a jacket 5 having an inlet 6 and an outlet 7 for cooling or heating fluid for maintaining the cylinder at the desired temperature. An inlet pipe 8 for the cream to be churned extends through the wall 3 so that cream can be introduced into the churn. Two shafts 9 and 10 are rotatably mounted inside of the cylinder 2, the shafts being coaxial with each other, the shaft 9 fitting within the shaft 10. Each of the shafts extends out of the end of the cylinder, the shaft 9 being provided with a gear 11 and the shaft 10 with a gear 12. A packing gland 13 forms a seal between the plate 3 and the shaft 10. Churning vanes 14 are mounted on the shaft 10 and churning vanes 15 are mounted on the shaft 9.

The manner for adjustably mounting the vanes 14 and 15 is shown more particularly in Figure 3. A fork 16 is pivotally connected at 17 adjacent each end of each of the vanes. Each fork has a cylindrical shank 18 which is externally threaded and is screwed into a block 19. A pin 20 secured to one of the shafts 9 or 10 is externally threaded and is screwed into the other end of the block 19. The threads on the pin 20 and the shank 18 are of opposite hand so that when the block 19 is turned it acts as a turn buckle and moves the pivot 17 toward or away from the interior surface of the cylinder 2. A vane can be moved toward or away from the interior surface of the cylinder 2 by turning both blocks 19 connected to a vane the same amount so as to maintain the vane parallel with the cylinder 2, but vary the distance between the vane and the cylinder, or by turning two blocks 19 connected to the same vane a different amount one end of the vane can be moved a greater distance than the other end so as to vary the obliquity of the vane in an axial direction with respect to the peripheral wall of the container. Nuts 21 are provided on the shanks 18 of the forks 16 and on the pins 20 for locking the blocks 19 once they have been set in the desired position. This manner of mounting the vanes, as shown in Figure 3, is also used in connection with the other embodiments of the invention about to be described.

Figure 2 illustrates a modification of the invention in which provision is made for preventing air from entering the churning cylinder during the churning operation. This embodiment is generally similar to that shown in Figures 1 and 3 and corresponding parts have been marked with the same reference numerals with the letter a suffixed. A compressing drum 25 is secured to the shaft 9a and is located adjacent the churn outlet opening 4a. This compressing drum is in the form of a disc, the mantle of which is provided with ribs 26. The peripheral face 27 of the compressing drum is located a small distance, say 3 millimeters, from the inner face of the cylinder 2a. During churning, the mass being churned is thrown against the cylinder 2a by the compressing drum provided with ribs, thereby substantially sealing the annular space between the periphery of the compressing drum and the cylinder so as to substantially prevent entrance of air into the churn.

Figure 5:
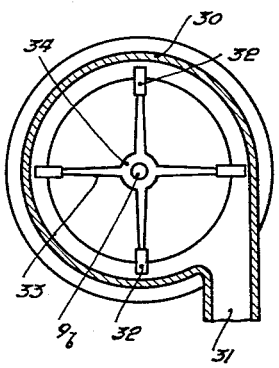
Figure 5 is a vertical section taken on the line V—V of Figure 4.

Another arrangement for preventing air from entering the churn during the churning operation is illustrated in Figures 4 and 5. Parts corresponding to those shown in Figures 1 and 3 have been marked with the same reference numerals with the letter b suffixed. The outlet 4b of the cylinder 2b is closed by a cover 30 which has an outlet 31, as shown in Figure 5. Discharge vanes 32 are located within the cover and are mounted on arms 33 secured to a hub 34 which is rigidly mounted at the outer end of the shaft 9b. During a churning operation the butter rotating at high speed leaves the cylinder 2b and is thrown into the cover 30. It is collected by the vanes 32 and discharged into the outlet passage 31. From the start of the churning operation the outlet passage is filled with a mass of compressed butter which insures a tight closure of the cylinder 2b.

Figure 6:
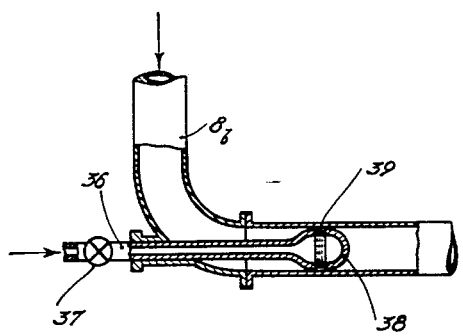
Figure 6 is a vertical section, on an enlarged scale, of a portion of the inlet pipe for introducing cream into the churn and showing also means for supplying air or other gas to the cream before it enters the churn.

In order to introduce a desired amount of air or other gas, for example carbon dioxide, into the butter, an arrangement such as shown in Figure 6 may be employed. A pipe 36 extends into the supply pipe 8b through which cream is introduced into the cylinder 2b. This pipe 36 is connected to a source of compressed air or other suitable gas and is provided with a valve 37. The pipe 36 terminates in an egg-shaped hollow body 38 located within the pipe 8b. The hollow body 38 is made in two parts connected by an annular filtering cloth 39, the function of which is to finely disperse the air into the material to be churned. By providing a hermetically sealed churning cylinder and then supplying the desired amount of air or other gas to the material to be churned, accurate control can be maintained of the amount of air in the butter so as to best adapt it for use in the moulding and packaging machines which are used in conjunction with the churn.

As previously stated, the two shafts, such as shafts 9, 10, 9a, 10a, 9b and 10b, which carry the sets of vanes 14, 15, 14a, 15a, 14b and 15b, are independently rotatable at variable speeds. One suitable arrangement for driving the shafts is shown in Figure 7, although any other suitable means may be employed. The gear 11 which drives the shaft 9 meshes with a gear 40 secured to the drive shaft 41 of a hydraulic engine 42. The gear 12 which drives the shaft 10 meshes with a gear 43 connected to the drive shaft 44 of a hydraulic engine 45. A pump 47 driven by an electric motor 48 draws water from a tank 49 through conduit 50 and discharges it through a conduit 51. The conduit 51 divides into a conduit 52 leading to the hydraulic engine 45 and into a conduit 53 leading to the hydraulic engine 42. A valve 52a is located in the conduit 52 and a valve 53a is located in the conduit 53, these valves controlling the flow of water to the hydraulic engines 42 and 45, and thereby controlling the speed of rotation of the shafts 9 and 10. The water after having passed through the hydraulic engines 42 and 45 is returned through a conduit 54 to the tank 49. A bypass 55 provided with a safety valve 56 connects the outlet of the pump 47 with the tank 49.

In carrying out a churning operation in an apparatus such as shown in Figures 4–6, the cream to be churned is introduced through the supply pipe 8b into the cylinder 2b. A desired amount of air or other gas is introduced into the cream in pipe 8b through pipe 36 controlled by valve 37. The shafts 9b and 10b are rotated, thereby rotating the vanes 14b and 15b and forming butter which is forced against the cylinder 2b and toward the outlet 4b. The butter and whey forced into the cover 30 are discharged through the outlet 31 by the discharge vanes 32. After leaving the outlet passage 31 the butter and whey are separated, the butter is washed in any suitable manner and is supplied to moulding and packaging machines.

Because of the provision for mounting the vanes 14b and 15b on independent shafts which can be rotated independently of each other and at variable relative speeds, the rotation speed of the vanes 14b can be adjusted so as to provide optimum butter making conditions, taking into consideration the particular cream being churned and the churning temperature. In a similar manner the speed of rotation of the vanes 15b can be adjusted so as to impart to the butter the desired water content. In order to further aid in obtaining optimum butter making conditions in the zone of the vanes 14b, the distance between the vanes 14b and the cylinder 2b can be adjusted by the arrangement shown in Figure 3 and the obliquity of those vanes in an axial direction with respect to the peripheral wall of the cylinder 2b also can be adjusted. The same adjustments can be made with respect to the vanes 15b in order to produce the optimum conditions for obtaining the desired water content in the butter. By sealing the cylinder against ingress of air and by introducing the desired quantity of air or other gas into the cylinder, the proper quantity of air in the butter for carrying out the moulding operation of the butter can be readily obtained.

The above described machine may be used with advantage for the manufacture of other products requiring a churning treatment, such as, for instance margarine and emulsions such as mayonnaise.

The invention is not limited to the preferred embodiment, which has been shown merely for purposes of illustration, but may be otherwise embodied or practiced within the scope of the following claims.

What I claim is:

1. A device for making butter in a continuous manner, which comprises a container having a cylindrical inner wall, an inlet for the milk product to be churned and an outlet for butter; said container having a constant inner diameter throughout its length, two shafts in said cylinder in axial alignment with each other and having their axes coaxial with the longitudinal axis of said cylinder, means for rotating said shafts independently of each other and at variable relative speeds, at least two pairs of radially extending arms secured to each of said shafts, said arms being adjustable in length independently of each other and having a free end extending towards the said cylindrical wall, a churning vane extending longitudinally of said container between the said arms of each pair and pivotally attached to the free ends of said arms, said churning vanes being independent from the said cylindrical inner wall and being adapted to displace said product toward said outlet.

2. A device according to claim 1, wherein each of said vanes is flat.

References Cited in the file of this patent

UNITED STATES PATENTS

| Number | Name | Date |
|---|---|---|
| 438,482 | Middlekauff | Oct. 14, 1890 |
| 726,120 | Urie | Apr. 21, 1903 |
| 1,708,947 | Jaeger | Apr. 16, 1929 |
| 1,869,859 | Morrow | Aug. 2, 1932 |
| 2,010,579 | Broadfield | Apr. 6, 1935 |
| 2,135,325 | Burt et al. | Nov. 1, 1938 |
| 2,139,274 | Justice et al. | Dec. 6, 1938 |
| 2,200,513 | Mitchel et al. | May 14, 1940 |
| 2,200,514 | Mitchel et al. | May 14, 1940 |
| 2,219,656 | Miller | Oct. 29, 1940 |
| 2,282,298 | Vogel | May 5, 1942 |
| 2,331,656 | Conner et al. | Oct. 12, 1943 |
| 2,386,493 | Moresco | Oct. 9, 1945 |
| 2,461,117 | Lindgren | Feb. 8, 1949 |
| 2,463,915 | Shadwick | Mar. 8, 1949 |
| 2,521,398 | North | Sept. 5, 1950 |
| 2,564,715 | North | Aug. 21, 1951 |
| 2,587,127 | Erickson et al. | Feb. 25, 1952 |